US008995356B2

(12) United States Patent
Wu et al.

(10) Patent No.: US 8,995,356 B2
(45) Date of Patent: Mar. 31, 2015

(54) CODING METHODS AND APPARATUS FOR BROADCAST CHANNELS

(75) Inventors: Xinzhou Wu, Monmouth Junction, NJ (US); Cyril Measson, Somerville, NJ (US); Nilesh Khude, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 12/640,336

(22) Filed: Dec. 17, 2009

(65) Prior Publication Data

US 2011/0087768 A1     Apr. 14, 2011

Related U.S. Application Data

(60) Provisional application No. 61/251,606, filed on Oct. 14, 2009.

(51) Int. Cl.
*H04W 4/00*     (2009.01)
*H04W 28/02*     (2009.01)
*H04L 1/00*     (2006.01)

(52) U.S. Cl.
CPC ............ *H04W 28/02* (2013.01); *H04L 1/0009* (2013.01); *H04L 1/0025* (2013.01); *H04L 1/0028* (2013.01); *H04L 2001/0092* (2013.01)
USPC ............ 370/329; 370/331; 455/509; 455/513

(58) Field of Classification Search
USPC ........ 370/235, 529, 335, 509; 455/452.1, 513
See application file for complete search history.

(56) References Cited

U.S. PATENT DOCUMENTS 5,761,438 A    6/1998   Sasaki
8,340,044 B2   12/2012   Laroia et al.
(Continued)

FOREIGN PATENT DOCUMENTS

CN           1468001 A      1/2004
CN           1630376 A      6/2005
(Continued)

OTHER PUBLICATIONS

International Search Report and Written Opinion—PCT/US2010/052371—International Search Authority, European Patent Office,Feb. 9, 2011.
(Continued)

*Primary Examiner* — Awet Haile
(74) *Attorney, Agent, or Firm* — James K. O'Hare

(57) ABSTRACT

Methods and apparatus related to selecting and/or using different coding methods for a broadcast channel are described. The coding method to be used is selected as a function of an estimated level of congestion. Various methods and apparatus are well suited for use in peer to peer wireless communications systems including broadcast peer discovery channels. A wireless communications device, e.g., a mobile terminal supporting peer to peer signaling, detects peer discovery signals from other devices and estimates a level of congestion. The wireless communications device selects one of a plurality of alternative coding methods as a function of the estimated level of congestion. Two different coding methods which may be used, in some embodiments, vary in at least one of: coding rate, convolution code used, and amount of resources used. The wireless device transmits information indicating the selected coding method and coded peer discovery data in accordance with the selected coding method.

17 Claims, 16 Drawing Sheets

(56) References Cited

U.S. PATENT DOCUMENTS

| | | | |
|---|---|---|---|
| 2001/0017883 A1* | 8/2001 | Tiirola et al. | 375/148 |
| 2005/0099992 A1* | 5/2005 | Sato | 370/350 |
| 2005/0147307 A1 | 7/2005 | Kitamura | |
| 2006/0067257 A1 | 3/2006 | Bonta | |
| 2007/0043558 A1 | 2/2007 | Schwarz et al. | |
| 2007/0091815 A1 | 4/2007 | Tinnakornsrisuphap et al. | |
| 2007/0105576 A1* | 5/2007 | Gupta et al. | 455/509 |
| 2007/0105579 A1 | 5/2007 | Shaffer et al. | |
| 2007/0159966 A1* | 7/2007 | Sumner et al. | 370/229 |
| 2008/0037487 A1* | 2/2008 | Li et al. | 370/338 |
| 2008/0207215 A1* | 8/2008 | Chu et al. | 455/452.2 |
| 2009/0016146 A1 | 1/2009 | Fujisawa | |
| 2009/0016255 A1 | 1/2009 | Park | |
| 2009/0111497 A1* | 4/2009 | Bitter et al. | 455/513 |
| 2009/0147680 A1* | 6/2009 | Liu | 370/232 |
| 2009/0161546 A1* | 6/2009 | Key et al. | 370/236 |
| 2009/0196182 A1* | 8/2009 | Barnett et al. | 370/236.1 |
| 2010/0150263 A1* | 6/2010 | Peake et al. | 375/295 |
| 2011/0205899 A1* | 8/2011 | Hosein | 370/235 |

FOREIGN PATENT DOCUMENTS

| | | |
|---|---|---|
| CN | 101325803 A | 12/2008 |
| CN | 101364946 A | 2/2009 |
| EP | 1906689 A1 | 4/2008 |
| JP | H10303909 A | 11/1998 |
| JP | 2004140592 A | 5/2004 |
| JP | 2007123132 A | 5/2007 |
| JP | 2009036877 A | 2/2009 |
| JP | 4927857 | 2/2012 |
| JP | 5139525 | 11/2012 |
| WO | WO2008118186 A1 | 10/2008 |
| WO | 2009009384 | 1/2009 |
| WO | 2009009452 | 1/2009 |
| WO | 2009058422 | 5/2009 |

OTHER PUBLICATIONS

Taiwan Search Report—TW099135121—TIPO—Jun. 5, 2013.

\* cited by examiner

1200

| CONGESTION LEVEL / CODING METHOD MAPPING INFORMATION | | |
|---|---|---|
| ESTIMATED LEVEL OF NETWORK CONGESTION | CODING METHOD USED FOR PEER DISCOVERY DATA | PILOT SEQUENCE USED TO CONVEY CODING METHOD USED |
| LEVEL 1 – HIGH CONGESTION LEVEL | METHOD 1 | PILOT SEQUENCE 1 |
| LEVEL 2 – LOW CONGESTION LEVEL | METHOD 2 | PILOT SEQUENCE 2 |

| CONGESTION LEVEL / CODING METHOD MAPPING INFORMATION | | |
|---|---|---|
| ESTIMATED LEVEL OF NETWORK CONGESTION | CODING METHOD USED FOR PEER DISCOVERY DATA | PILOT SEQUENCE USED TO CONVEY CODING METHOD USED |
| LEVEL 1 – HIGH CONGESTION LEVEL | METHOD 1 | PILOT SEQUENCE 1 |
| LEVEL 2 – INTERMEDIATE CONGESTION LEVEL | METHOD 2 | PILOT SEQUENCE 2 |
| LEVEL 3 – LOW CONGESTION LEVEL | METHOD 3 | PILOT SEQUENCE 3 |

| CONGESTION LEVEL / CODING METHOD MAPPING INFORMATION |||
|---|---|---|
| ESTIMATED LEVEL OF NETWORK CONGESTION | CODING METHOD USED FOR PEER DISCOVERY DATA | CODING RATE |
| LEVEL 1 | METHOD 1 | CODING RATE 1 |
| LEVEL 2 | METHOD 2 | CODING RATE 2 |
| ⋮ | ⋮ | ⋮ |
| LEVEL N | METHOD N | CODING RATE N |

| CONGESTION LEVEL / CODING METHOD MAPPING INFORMATION |||
|---|---|---|
| ESTIMATED LEVEL OF NETWORK CONGESTION | CODING METHOD USED FOR PEER DISCOVERY DATA | CONVOLUTION CODE USED |
| LEVEL 1 | METHOD 1 | CONVOLUTION CODE 1 |
| LEVEL 2 | METHOD 2 | CONVOLUTION CODE 2 |
| ⋮ | ⋮ | ⋮ |
| LEVEL N | METHOD N | CONVOLUTION CODE N |

FIGURE 15

CODING METHODS AND APPARATUS FOR BROADCAST CHANNELS

RELATED APPLICATIONS

The present application claims the benefit of U.S. Provisional Patent Application Ser. No. 61/251,606 filed on Oct. 14, 2009, titled "METHODS AND APPARATUS FOR CODEBOOK ADAPTATION FOR BROADCAST CHANNELS", which is hereby incorporated by reference and which is assigned to the assignee hereof.

FIELD

Various embodiments relate to wireless communications, and more particularly, to methods and apparatus for selecting and/or using different coding methods based on estimated congestion.

BACKGROUND

In various peer to peer networks it is often desirable for a device to be able to broadcast a small amount of information about itself relatively frequently and to be able to recover similar information being broadcast from other devices which may be currently in its local vicinity. This allows peer to peer devices to discover information about one another and remain situationaly aware. Typically there is a limited amount of air link resources available for discovery purposes, and resources allocated to discovery are normally unavailable for other signaling purposes such as peer to peer channel traffic signaling.

In the case of unicast transmissions it is a common practice to adapt coding methods based upon Signal Interference Noise Ratio (SINR) feedback from a receiver to more efficiently use available resources. However in the case of broadcast channels this is normally not practical. In broadcast channels, including some peer discovery channels, there is typically no channel SINR feedback from receivers.

It would be desirable if a metric other than SINR feedback from a receiver could be used to adaptively control broadcast transmissions, e.g., peer to peer discovery signal transmissions.

SUMMARY

Methods and apparatus related to selecting and/or using different coding methods for a broadcast channel are described. The coding method to be used is selected as a function of an estimated level of congestion. Various methods and apparatus are well suited for use in peer to peer wireless communications systems including broadcast peer discovery channels.

In one exemplary embodiment, a wireless communications device, e.g., a mobile terminal supporting peer to peer signaling, detects peer discovery signals from other devices and estimates a level of congestion, e.g., network congestion. In at least some embodiments, the wireless communications device selects one of a plurality of alternative coding methods, e.g., for broadcast transmissions, as a function of the estimated level of network congestion. Two different coding methods which may be used, in some embodiments, vary in at least one of: coding rate, convolution code used, and amount of resources used. The wireless device transmits information indicating the selected coding method and coded peer discovery data in accordance with the selected coding method.

An exemplary method of operating a wireless communications device, in accordance with some embodiments, comprises: estimating a level of network congestion; selecting one of a plurality of different coding methods based on the estimated level of network congestion; and transmitting data coded using the selected one of the plurality of different coding methods. An exemplary wireless communications device, in accordance with some embodiments, comprises: at least one processor configured to: estimate a level of network congestion; select one of a plurality of different coding methods based on the estimated level of network congestion; and transmit data coded using the selected one of the plurality of different coding methods. The exemplary wireless communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 12 is a table illustrating exemplary congestion level/coding method mapping information for an exemplary embodiment in which different coding methods are used corresponding to different estimated levels of network congestion and pilots are used to convey coding method information.

FIG. 13 is a table illustrating exemplary congestion level/coding method mapping information for another exemplary embodiment in which different coding methods are used corresponding to different estimated levels of network congestion and pilots are used to convey coding method information.

FIG. 14 is a table illustrating exemplary congestion level/coding method mapping information for an exemplary embodiment in which different coding methods are used corresponding to different estimated levels of network congestion and at least some different coding methods correspond to different coding rates.

FIG. 15 is a table illustrating exemplary congestion level/coding method mapping information for an exemplary embodiment in which different coding methods are used corresponding to different estimated levels of network congestion and at least some different coding methods correspond to different convolution codes.

DETAILED DESCRIPTION

Figure 1:
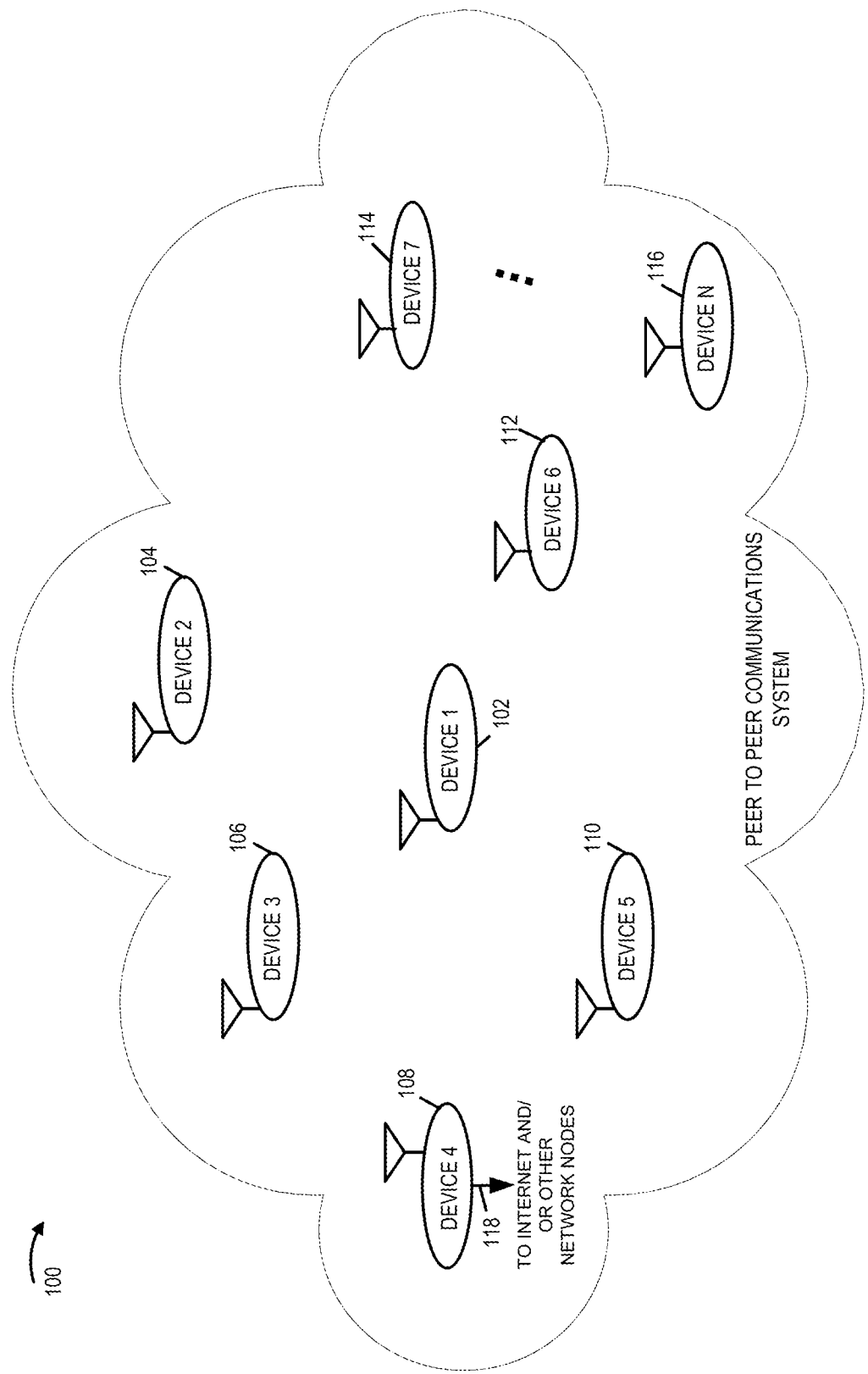
FIG. 1 is a drawing of an exemplary peer to peer communications system in accordance with an exemplary embodiment.

FIG. 1 is a drawing of an exemplary peer to peer communications system 100 in accordance with an exemplary embodiment. Exemplary peer to peer communications system 100 includes a plurality of wireless communications devices (device 1 102, device 2 104, device 3 106, device 4 108, device 5 110, device 6 112, device 7 114, . . . , device N 116. Some of the wireless communications devices, e.g., device 1 102, device 2 104, device 3 106, device 5 110, device 6 112, device 7 114, and device N 116, are mobile wireless communications devices, e.g., handheld wireless terminals supporting peer to peer communications. Some of the wireless communications devices, e.g., device 4 108, include an interface 118, e.g., a wired or fiber optic interface, coupling the device to the Internet and/or other network nodes via a backhaul network. Device 4 108 is, e.g., an access point supporting peer to peer communications. Peer to peer communications system 100 uses a recurring peer to peer timing structure including sets of peer discovery resources.

An exemplary wireless terminal in peer to peer communications system 100 estimates a level of network congestion and selects one of a plurality of different coding methods as a function of the estimated level of network congestion. Then, the wireless communications device transmits data coded using the selected one of the plurality of different coding methods. In some embodiments, the level of network congestion is a level of network congestion with regard to a peer discovery communications resource; the different coding methods are different alternative coding methods that may be used for peer discovery signaling, and the transmitted data is peer discovery data.

Figure 2:
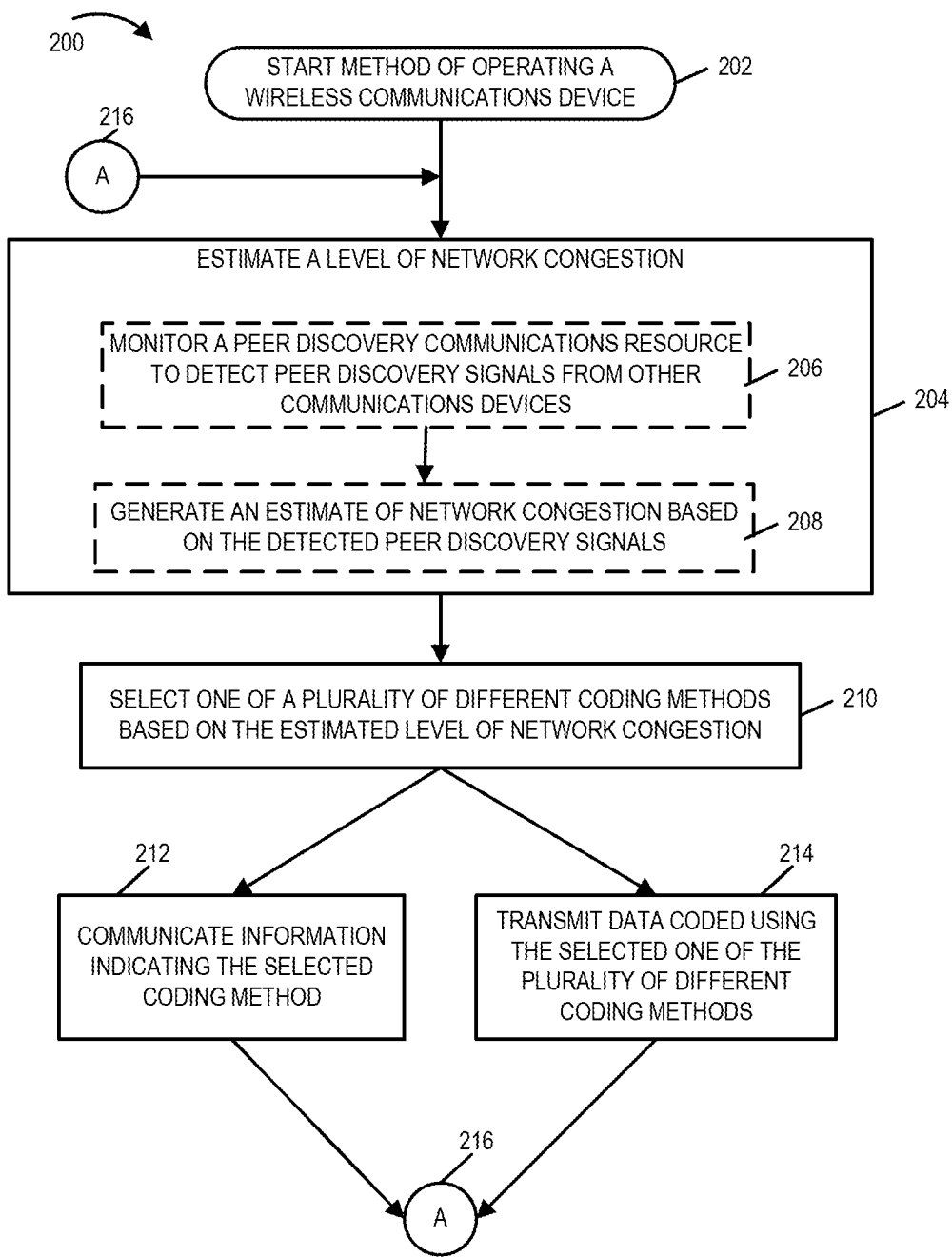
FIG. 2 is a flowchart of an exemplary method of operating a communications device in accordance with an exemplary embodiment.

FIG. 2 is a flowchart 200 of an exemplary method of operating a wireless communications device in accordance with an exemplary embodiment. The exemplary wireless communications device is, e.g., one of the wireless communications devices of peer to peer system 100 of FIG. 1, e.g., a handheld mobile terminal supporting peer to peer communications. Operation starts in step 202 where the wireless communications device is powered on and initialized and proceeds to step 204.

In step 204 the wireless communications device estimates a level of network congestion. In various embodiments, the network congestion estimate is generated without the aid of a signal from another device communicating a level of network congestion. In some embodiments, step 204 includes sub-steps 206 and 208. In sub-step 206 the wireless communications device monitors a peer discovery communications resource to detect peer discovery signals from other communications devices. In some embodiments, different pilot signals, e.g., different pilot symbol sequences, are used as part of the peer discovery signaling implementation to facilitate the detection of different transmitting devices and estimate a level of network congestion. For example, two different devices transmitting on the same peer discovery communications resource may use different pilot symbol sequences and by listening to that shared communications resource, another device can detect the existence of both devices. Operation proceeds from sub-step 206 to sub-step 208. In sub-step 208 the wireless communications device generates an estimate of network congestion based on the detected peer discovery signals.

Operation proceeds from step 204 to step 210. In step 210 the wireless communications device selects one of a plurality of different coding methods based on the estimated level of network congestion. In some embodiments, the plurality of different coding methods correspond to a plurality of different coding rates. In some embodiments, the plurality of different coding methods include at least two different methods each of which uses a different convolution code. In some embodiments, the plurality of different coding methods correspond to different amounts of resource usage. Operation proceeds from step 210 to steps 212 and 214.

In step 212 the wireless communications device communicates information indicating the selected coding method. In step 214 the wireless communications device transmits data coded using the selected one of the plurality of different coding methods. In some embodiments, transmitting data includes transmitting said data coded using the selected coding method on a broadcast channel. In some such embodiments, the broadcast channel is a peer discovery channel in an ad hoc peer to peer communications network. In some embodiments, at least one of the coding methods uses less than all of the available resources for transmitting data. In some such embodiments, at least one of the coding methods uses ⅓ of the available resources, e.g., degrees of freedom, for communicating data. Operation proceeds from steps 212 and 214 via connecting node A 216 to step 204.

In some embodiments, the communicated information indicated the selected coded method is communicated using a peer discovery communications resource, e.g., a peer discovery communications segment. In some such embodiments, the selected coded method is communicated using pilot signals, e.g., a pilot symbol sequence in a peer discovery communications segment. In various embodiments, the transmitted data, coded using the selected one of the plurality of different coding methods is communicated in a peer discovery communications resource. In some such embodiments the communicated information indicating the selected coding method and the transmitted data coded using the selected one of the plurality of different coding methods is communicated in the same peer discovery communications resource.

In some embodiments, the communicated information indicating the selected coding method is communicated in a coding method bits field in a control channel resource and the transmitted data coded using the selected one of the plurality of different coding methods is communicated in a peer discovery communications resource or resources. In some embodiments, communicated information indicating the selected coding method used is communicated less frequently that transmitted data coded using the selected one of the plurality of different coding methods.

Figure 3:
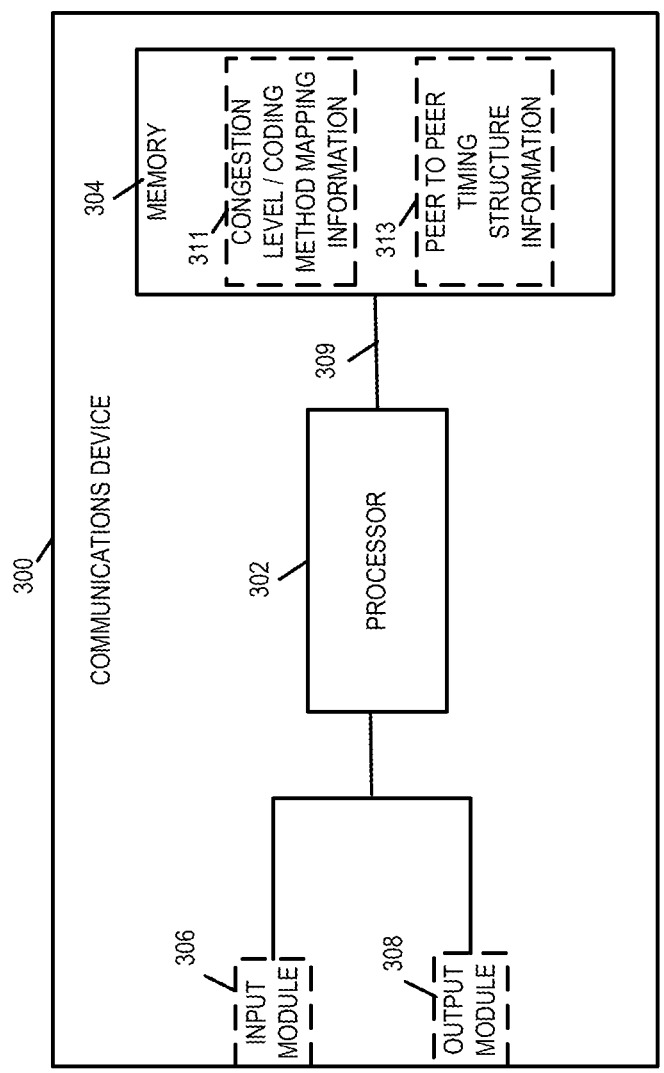
FIG. 3 is a drawing of an exemplary communications device, in accordance with an exemplary embodiment.

FIG. 3 is a drawing of an exemplary wireless communications device 300, in accordance with an exemplary embodiment. Exemplary communications device 300 is, e.g., one of the wireless communications devices of FIG. 1. Exemplary wireless communications device 300 may, and sometimes does, implement a method in accordance with flowchart 200 of FIG. 2.

Wireless communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

In some embodiments, memory 304 includes congestion level/coding method mapping information 311 and/or peer to peer timing structure information 313. Some examples of exemplary information that may be included in congestion level/coding method mapping information 311 are included in FIGS. 12, 13, 14, 15 and 16. Exemplary peer to peer timing structure information 313 includes, e.g., information used to derive a peer to peer recurring timing structure, e.g., information used to derive a structure such as described in any of one or more of FIGS. 5-10.

Processor 302 is configured to: estimate a level of network congestion; select one of a plurality of different coding methods based on the estimated level of network congestion; and transmit data coded using the selected one of the plurality of different coding methods. In some embodiments, said plurality of different coding methods correspond to a plurality of different coding rates.

In some embodiments, processor 302 is configured to transmit data coded using the selected coding method on a broadcast channel, as part of being configured to transmit data coded using the selected one of the plurality of coding methods. In some embodiments, said broadcast channel is a peer discovery channel in an ad hoc peer to peer communications network.

In various embodiments, processor 302 is further configured to: communicate information indicating the selected coding method. In some embodiments, processor 302 is further configured to: monitor a peer discovery communications resource to detect peer discovery signals from other communications devices; and generate an estimate of network congestion based on the detected peer discovery signals, as part of being configured to estimate a level of network congestion. In various embodiments, processor 302 is further configured to generate said estimate of network congestion without the aid of a signal from another device communicating a level of network congestion.

In some embodiments, at least one of the coding methods uses less than all the available resources for transmitting data. In some such embodiments, at least one of the coding methods uses ⅓ of the available resources (e.g., degrees of freedom) for communicating said data. In some embodiments, said plurality of different coding methods include at least two different methods each of which uses a different convolution code.

Figure 4:
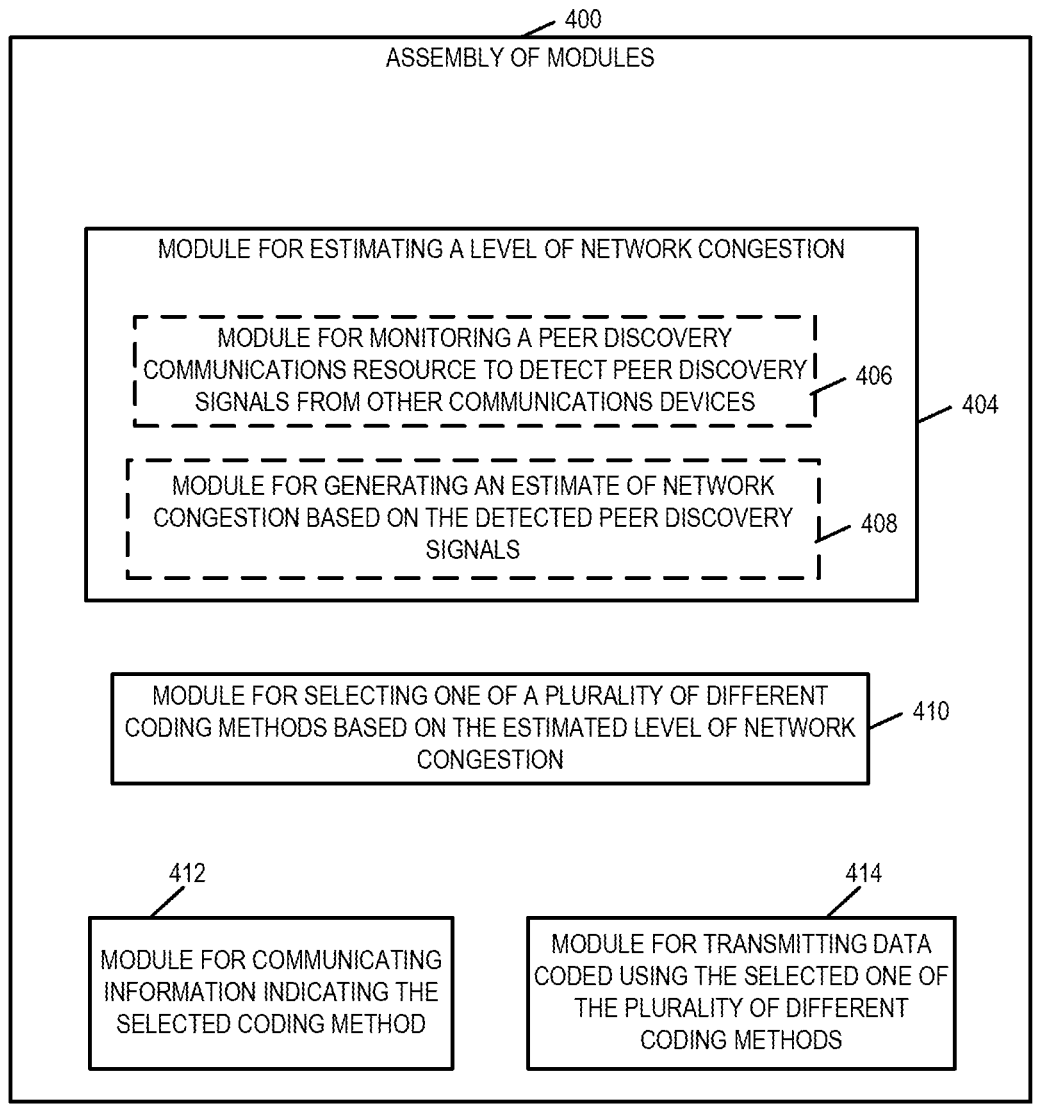
FIG. 4 is an assembly of modules which can, and in some embodiments is, used in the communications device illustrated in FIG. 3.

FIG. 4 is an assembly of modules 400 which can, and in some embodiments is, used in the wireless communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of the communications device 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the communications device 300 or elements therein such as the processor 302, to perform the functions of the corresponding steps illustrated in the method flowchart 200 of FIG. 2.

Assembly of modules 400 includes a module 404 for estimating a level of network congestion, a module 410 for selecting one of a plurality of different coding methods based on the estimated level of network congestion, a module 412 for communicating information indicating the selected coding method, and a module 414 for transmitting data coded using the selected one of the plurality of different coding methods. In some embodiments, module 404 includes a module 406 for monitoring a peer discovery communications resource to detect peer discovery signals from other communications devices and a module 408 for generating an estimate of network congestion based on the detected peer discovery signals.

In some embodiments, said plurality of different coding methods correspond to a plurality of different coding rates. In some embodiments, said module 414 for transmitting data coded using the selected coding one of the plurality of method transmits said data on a broadcast channel. In some such embodiments, said broadcast channel is a peer discovery channel in an ad hoc peer to peer communications network.

In some embodiments, said module 408 for generating an estimate of network congestion generates said network congestion estimate without the aid of a signal from another device communicating a level of network congestion. In some embodiments, at least one of the coding methods uses less than all the available resources for transmitting data. In some such embodiments, said at least one of the coding methods uses ⅓ of the available resources (e.g., degrees of freedom) for communicating said data. In various embodiments, said plurality of different coding methods include at least two different methods each of which uses a different convolution code.

Figure 5:
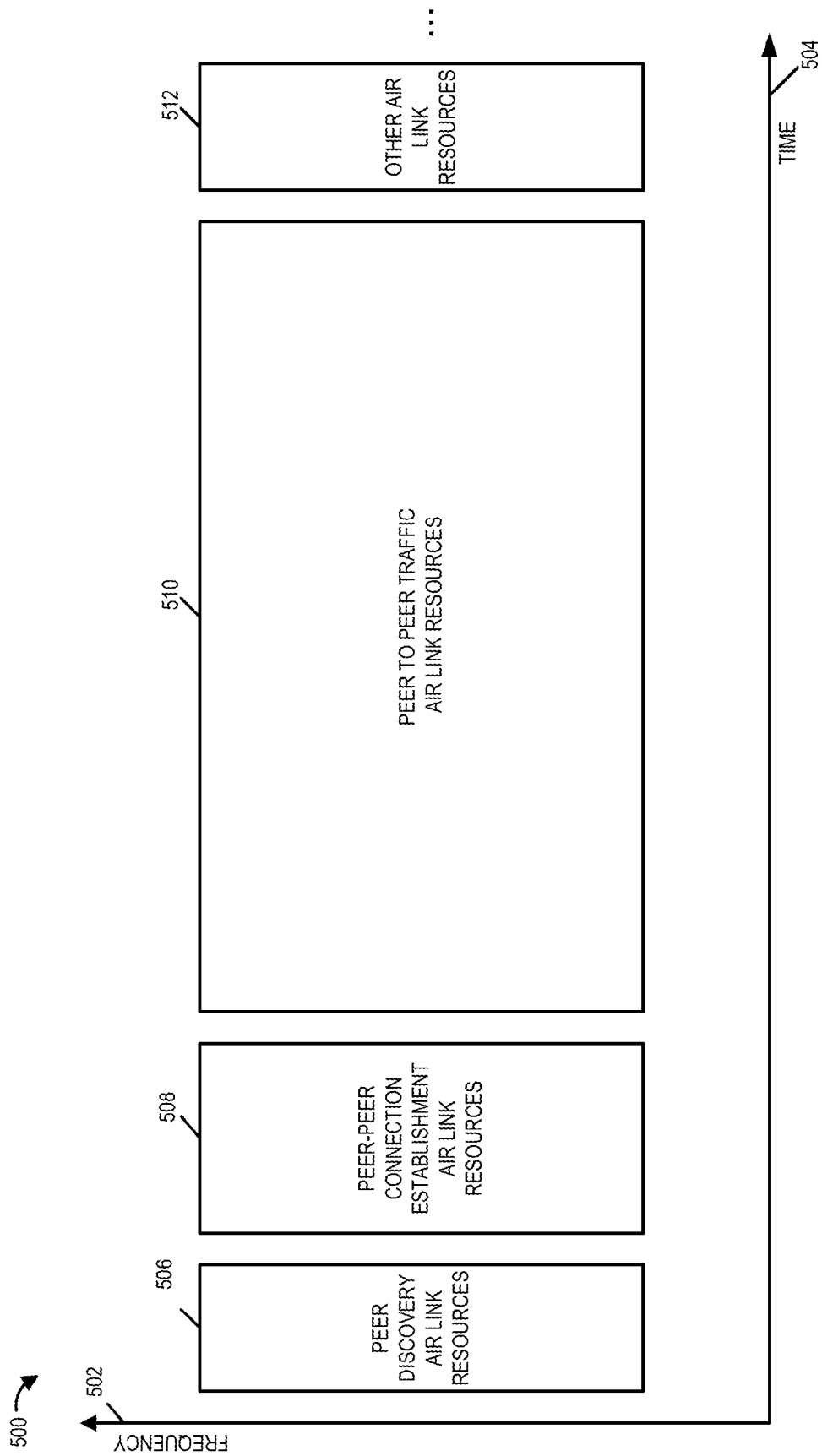
FIG. 5 is a drawing of an exemplary frequency vs time plot illustrating exemplary air link resources in an exemplary peer to peer recurring timing structure.

FIG. 5 is a drawing of an exemplary frequency vs time plot 500 illustrating exemplary air link resources in an exemplary peer to peer recurring timing structure. Frequency vs time plot 500 includes a vertical axis 502 representing frequency, e.g., OFDM tones, and a horizontal axis 504 representing time, e.g., OFDM symbol transmission time intervals. Plot 500 includes peer discovery air link resource 506, peer to peer connection establishment air link resources 508, peer to peer traffic air link resources 510 and other air link resources 512.

Figure 6:
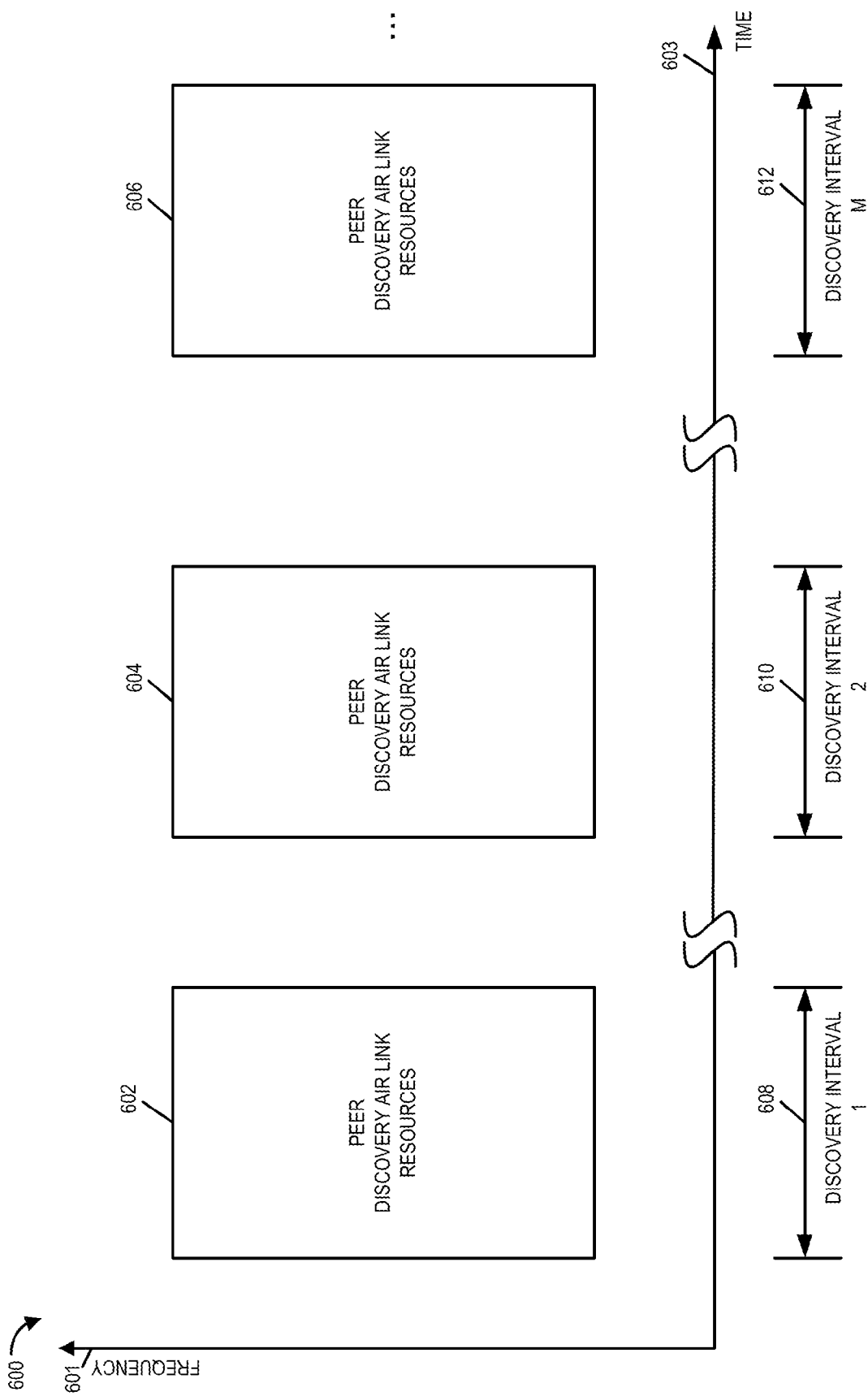
FIG. 6 is a drawing of an exemplary frequency vs time plot illustrating exemplary peer discovery air link resources in an exemplary peer to peer recurring timing structure.

FIG. 6 is a drawing of an exemplary frequency vs time plot 600 illustrating exemplary peer discovery air link resources in an exemplary peer to peer recurring timing structure. Frequency vs time plot 600 includes a vertical axis 601 representing frequency, e.g., OFDM tones, and a horizontal axis 603 representing time, e.g., OFDM symbol transmission time intervals. In this example, there are M discovery intervals (discovery interval 1 608, discovery interval 2 610, . . . , discovery interval M 612) in the recurring timing structure. Peer discovery air link resources 602 occurs during discovery interval 1 608; peer discovery air link resources 604 occurs during discovery interval 2 610; and peer discovery air link resources 606 occurs during discovery interval M 612. Peer discovery air link resource 506 of FIG. 5 is, e.g., any of the peer discovery air link resource blocks (602, 604, 606) of FIG. 6.

Figure 7:
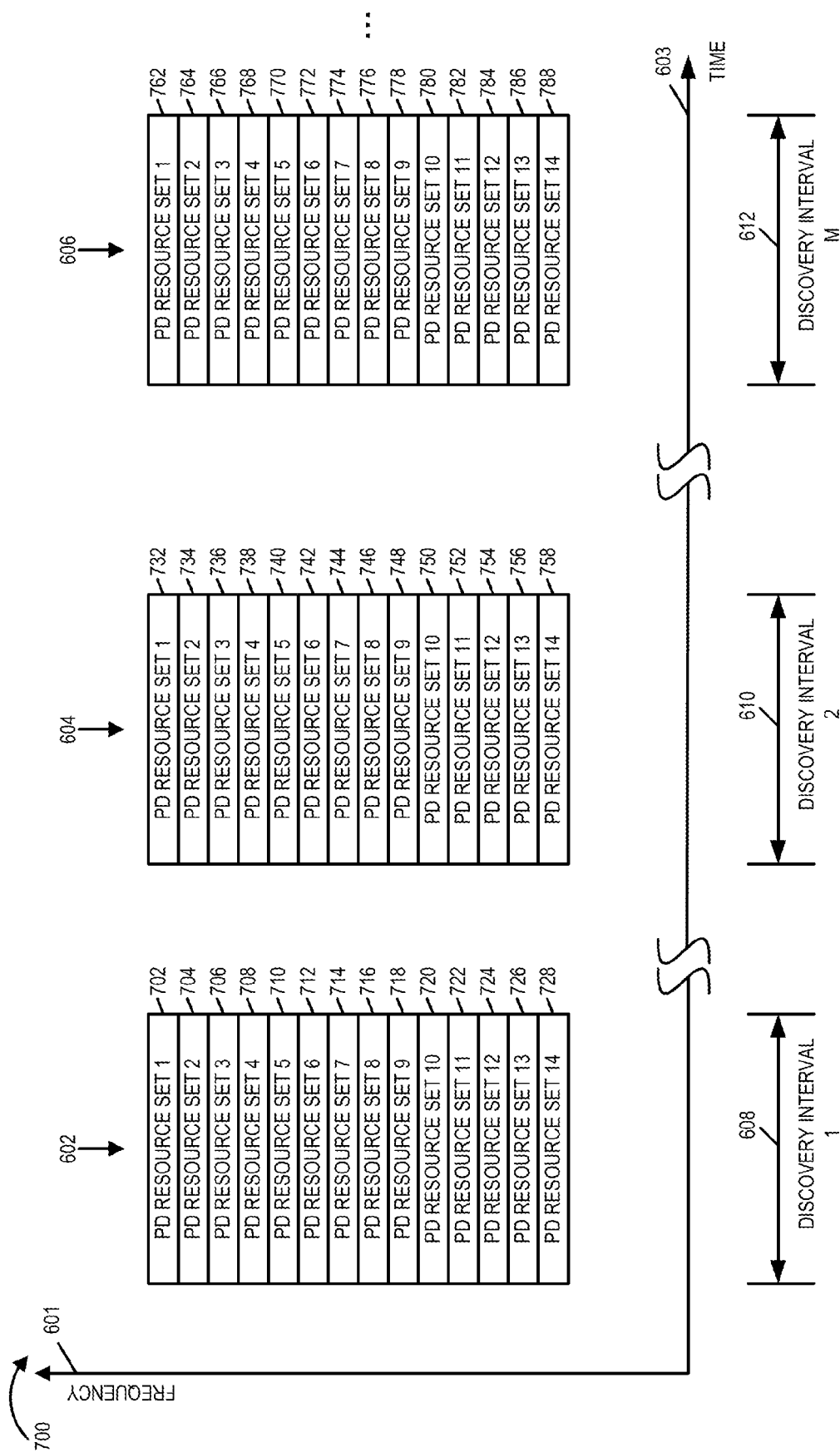
FIG. 7 is a drawing of an exemplary frequency vs time plot illustrating exemplary peer discovery resource sets within the peer discovery resource blocks illustrated in FIG. 6.

FIG. 7 is a drawing of an exemplary frequency vs time plot 700 illustrating exemplary peer discovery resource sets within the peer discovery resource blocks illustrated in FIG. 6. Peer discovery air link resources block 602 includes, in order from highest to lowest frequency, peer discovery resource set 1 702, peer discovery resource set 2 704, peer discovery resource set 3 706, peer discovery resource set 4 708, peer discovery resource set 5 710, peer discovery resource set 6 712, peer discovery resource set 7 714, peer discovery resources set 8 716, peer discovery resource set 9 718, peer discovery resource set 10 720, peer discovery resource set 11 722, peer discovery resource set 12 724, peer discovery resource set 13 726, and peer discovery resource set 14 728. Peer discovery air link resources block 604 includes, in order from highest to lowest frequency, peer discovery resource set 1 732, peer discovery resource set 2 734, peer discovery resource set 3 736, peer discovery resource set 4 738, peer discovery resource set 5 740, peer discovery resource set 6 742, peer discovery resource set 7 744, peer discovery resources set 8 746, peer discovery resource set 9 748, peer discovery resource set 10 750, peer discovery resource set 11 752, peer discovery resource set 12 754, peer discovery resource set 13 756, and peer discovery resource set 14 758. Peer discovery air link resources block 606 includes, in order from highest to lowest frequency, peer discovery resource set 1 762, peer discovery resource set 2 764, peer discovery resource set 3 766, peer discovery resource set 4 768, peer discovery resource set 5 770, peer discovery resource set 6 772, peer discovery resource set 7 774, peer discovery resources set 8 776, peer discovery resource set 9 778, peer discovery resource set 10 780, peer discovery resource set 11 782, peer discovery resource set 12 784, peer discovery resource set 13 786, and peer discovery resource set 14 788.

A peer discovery communications channel may include the peer discovery resource sets associated with a set number. For example, a first peer discovery communications channel may comprise the peer discovery resource sets associated with set number 1 (702, 732, . . . , 762). Similarly, a second peer discovery communications channel may comprise the peer discovery resource sets associated with set number 2 (704, 734, . . . , 764), and so on.

In the example of FIG. 7 a peer discovery resource block is partitioned into 14 exemplary peer discovery resource sets. In other examples, a peer discovery resource block may include a different number of peer discovery resource sets. In some such embodiments, a peer discovery resource block includes greater than 100 peer discovery resource sets. In some embodiments, the same peer discovery resource sets are not necessarily included in each successive peer discovery resource block. In some embodiments, there may be multiple peer discovery resource sets corresponding to the same tone in a peer discovery resource block, e.g., a first peer discovery resource set for a first time interval and a second peer discovery resource set for a second time interval.

Figure 8:
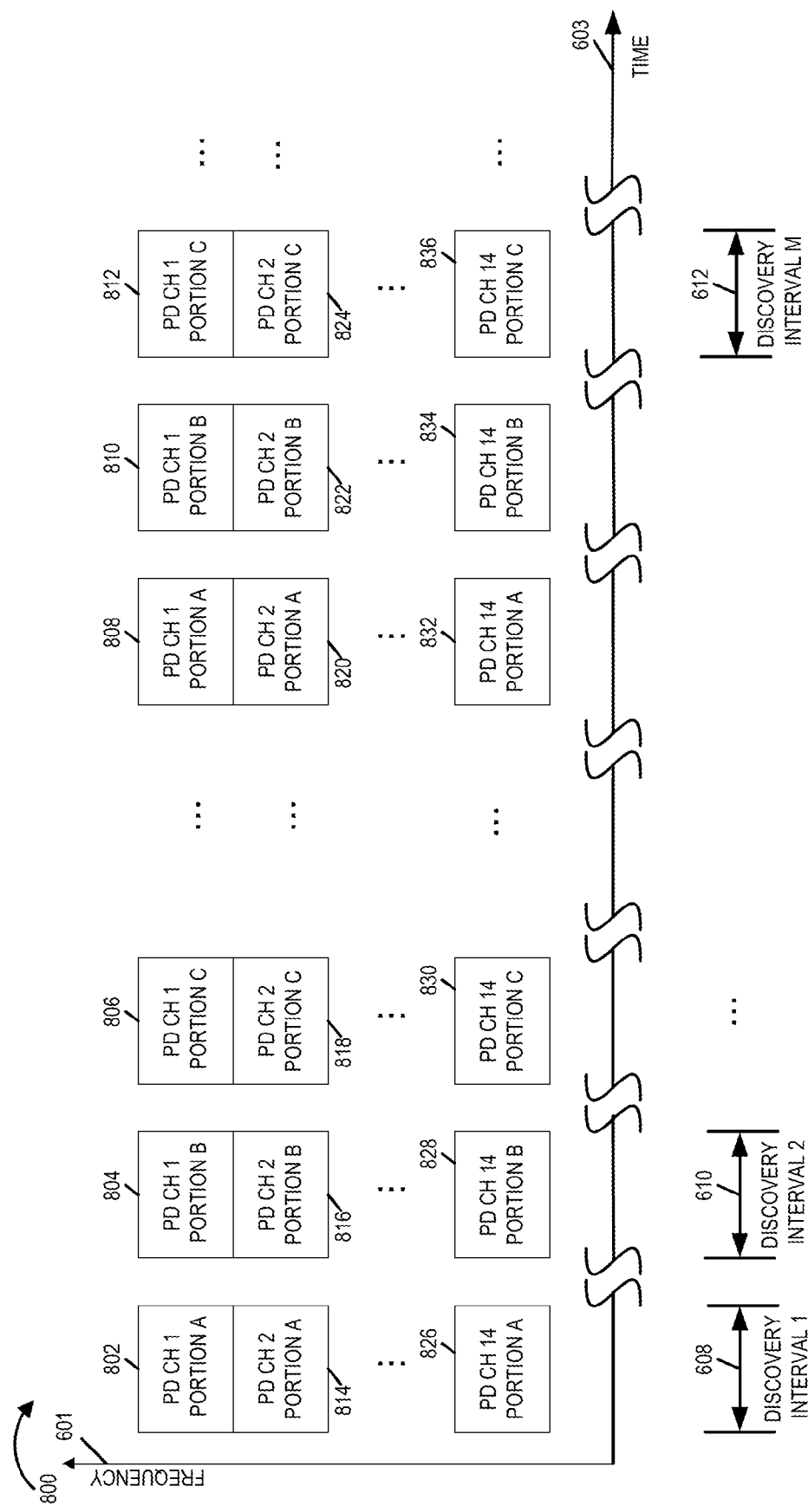
FIG. 8 is a drawing of an exemplary frequency vs time plot illustrating exemplary peer discovery channel portions in a recurring timing frequency structure.

FIG. 8 is a drawing of an exemplary frequency vs time plot 800 illustrating exemplary peer discovery channel portions in a recurring timing frequency structure. Vertical axis 601 represents frequency, e.g., OFDM tone-symbols, while horizontal axis 603 represents time, e.g., OFDM symbol transmission time intervals. In this example, there are 14 peer discovery communications channels, and M discovery intervals (discovery interval 1 608, discovery interval 2 610, . . . , discovery interval M 612. Each peer discovery channel includes channel portions. Peer discovery channel 1 includes a plurality of peer discovery channel 1 portions (PD channel 1 portion A 802, PD channel 1 portion B 804, PD channel 1 portion C 806, . . . , PD channel 1 portion A 808, PD channel 1 portion B 810, PD channel 1 portion C 812. Peer discovery channel 2 includes a plurality of peer discovery channel 2 portions (PD channel 2 portion A 814, PD channel 2 portion B 816, PD channel 2 portion C 818, . . . , PD channel 2 portion A 820, PD channel 2 portion B 822, PD channel 2 portion C 824. Peer discovery channel 14 includes a plurality of peer discovery channel 14 portions (PD channel 14 portion A 826, PD channel 14 portion B 828, PD channel 14 portion C 830, . . . , PD channel 14 portion A 832, PD channel 14 portion B 834, PD channel 14 portion C 836.

Each of the peer discovery channel portions of FIG. 8 may correspond to a peer discovery resource set. For example, peer discovery channel portions (PD channel 1 portion A 802, PD channel 1 portion B 804, peer discovery channel 1 portion C 812, peer discovery channel 2 portion A 814, peer discovery channel 2 portion B 816, peer discovery channel 2 portion C 824, peer discovery channel 14 portion A 826, peer discovery channel 14 portion B 828, peer discovery channel 14 portion C 836) of FIG. 8 may correspond to (peer discovery resource set 1 702, peer discovery resource set 1 732, peer discovery resource set 1 762, peer discovery resource set 2 704, peer discovery resource set 2 734, peer discovery resource set 2 764, peer discovery resource set 14 728, peer discovery resource set 14 758, peer discovery resource set 14 788) of FIG. 7.

In various embodiments, a wireless communications device monitors a recurring set of time frequency resource units, e.g., peer discovery time frequency resource units, and estimates a level of network congestion. The wireless communications device selects a coding method to use for its transmission peer discovery data transmission purposes as a function of the determined level of network congestion.

The wireless communications device communicates information indicating its selected coding method and also transmits coded peer discovery data in accordance with the selected coding method. Exemplary peer discovery data include, e.g., a device identifier, a user identifier, a group identifier, a request for a device or user, a request for a service, a request for a product, a request for information, an offer of service, an offer of a product, location information, etc.

Figure 9:
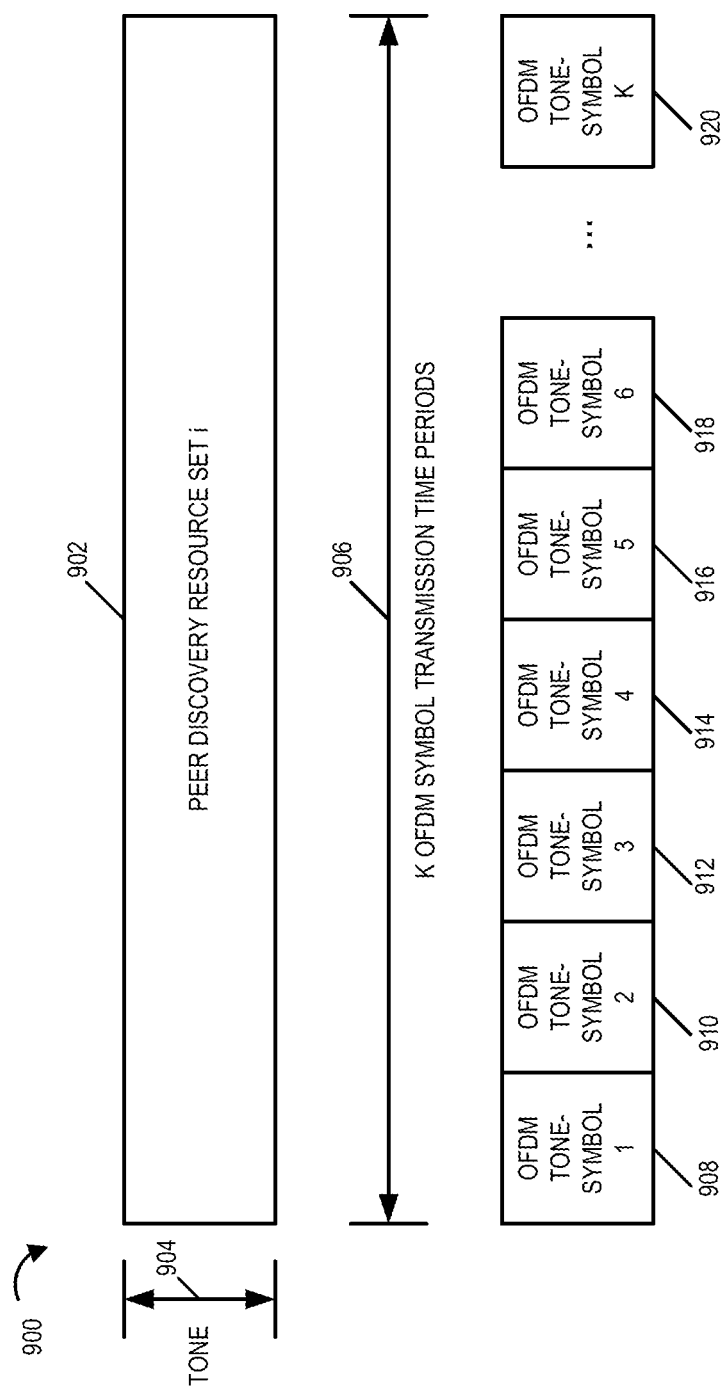
FIG. 9 is a drawing illustrating exemplary peer discovery resource set.

FIG. 9 is a drawing 900 illustrating exemplary peer discovery resource set i 902. Exemplary peer discovery resource set i 902 may be any of the peer discovery resource sets illustrated in FIG. 7 or any of the peer discovery channel portions illustrated in FIG. 8. Peer discovery resource set i 902 includes 1 tone 904 for the time duration of K OFDM symbol transmission time periods 906. Exemplary peer discovery resource set i 902 may be represented as K OFDM tone-symbols (OFDM tone-symbol 1 908, OFDM tone-symbol 2 910, OFDM tone-symbol 3 912, OFDM tone-symbol 4 914, OFDM tone-symbol 5 916, OFDM tone-symbol 6 918, . . . , OFDM tone-symbol K 920). In some embodiments, K is an integer greater than or equal to eight. In one exemplary embodiment K=16, and there are 16 OFDM tone-symbols in a peer discovery resource set. In another exemplary embodiment K=64, and there are 64 OFDM tone-symbols in a peer discovery resource set. In some embodiments, $K_P$ of the K tone-symbols are pilot tone-symbols, where $K/K_P \geq 4$. In one embodiment K=64 and $K_P$=8. In one embodiment K=72 and $K_P$=8. In some embodiments, the full set of K tone-symbols correspond to the same tone.

Figure 10:
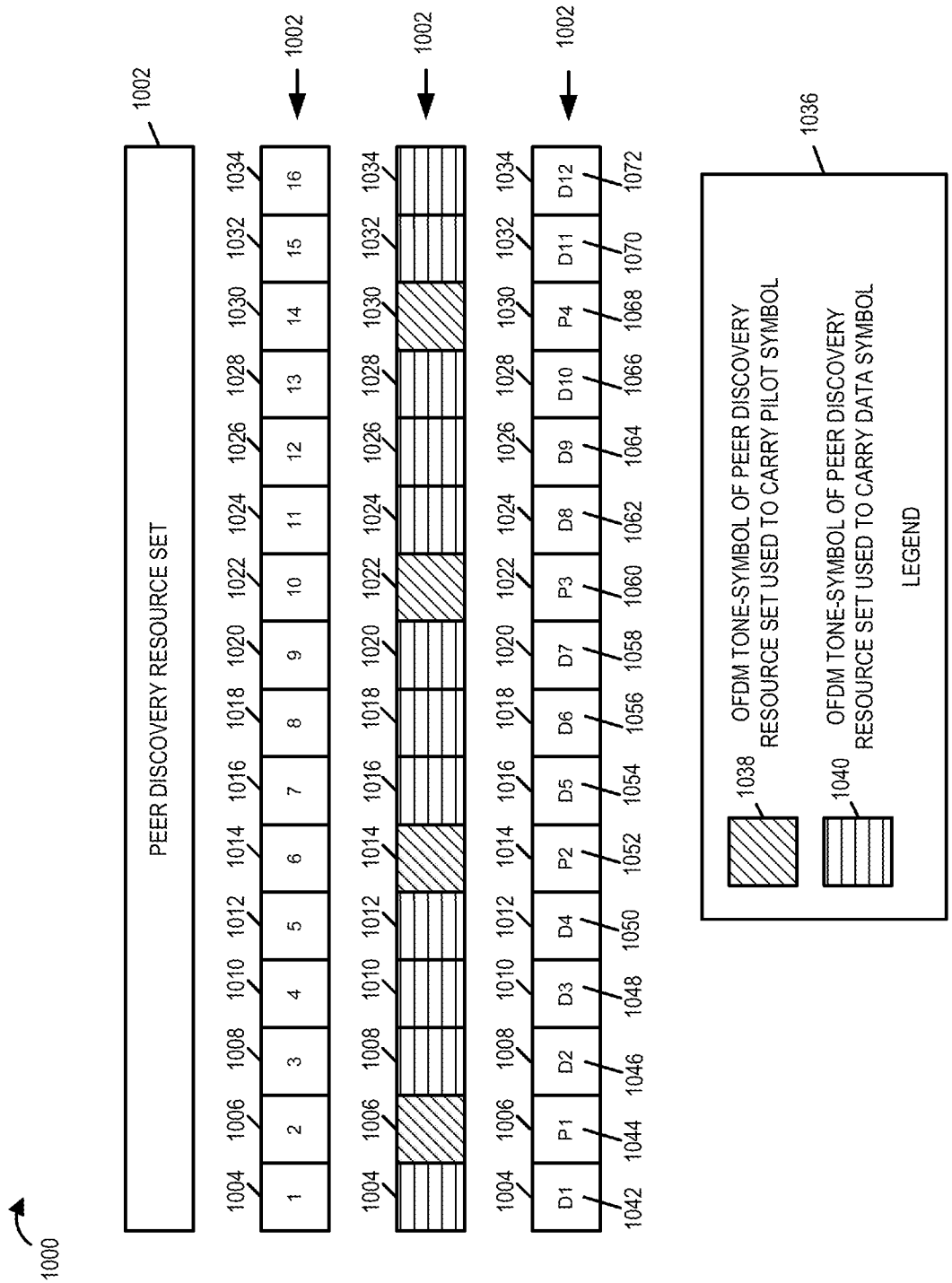
FIG. 10 is a drawing illustrating an exemplary peer discovery resource set used to carry pilot and data symbols.

FIG. 10 is a drawing 1000 illustrating an exemplary peer discovery resource set 1002 used to carry pilot and data symbols. Peer discovery resource set 1002 is, e.g., peer discovery resource set 902 of FIG. 9, where K=16 and $K_P$=4. Exemplary peer discovery resource set 1002 includes 16 indexed OFDM tone-symbols (tone-symbol 1 1004, tone-symbol 2 1006, tone-symbol 3 1008, tone-symbol 4 1010, tone-symbol 5 1012, tone-symbol 6 1014, tone-symbol 7 1016, tone-symbol 8 1018, tone-symbol 9 1020, tone-symbol 10 1022, tone-symbol 11 1024, tone-symbol 12 1026, tone-symbol 13 1028, tone-symbol 14 1030, tone-symbol 15 1032 and tone-symbol 16 1034).

Diagonal line shading, as indicated by box 1038 of legend 1036, indicates that an OFDM tone-symbol of the peer discovery resource set is used to carry a pilot symbol. Horizontal line shading, as indicated by box 1040 of legend 1036, indicates that an OFDM tone-symbol of the peer discovery resource set is used to carry a data symbol. In this example a first subset of tone-symbols (1006, 1014, 1022 and 1030) are designated to be used to carry pilot symbols, while a second non-overlapping subset of tone-symbols (1004, 1008, 1010, 1012, 1016, 1018, 1020, 1024, 1026, 1028, 1032, 1034) are used to carry the data symbols. In this example, the spacing between pilot designated tone-symbols is uniform with multiple data symbol designated tone-symbols being interspaced between the pilot designated tone-symbols. In some embodiments, the spacing between pilot designated tone-symbols is substantially uniform. In one embodiment, the tone-symbols designated to carry pilot symbols temporally precede the tone-symbols designated to carry data symbols. In some embodiments, the first and last tone-symbols of the peer discovery resource set are designated to carry pilot symbols.

In the example of FIG. 10, tone-symbols (1006, 1014, 1022 and 1030) carry pilot symbols (P1 1044, P2 1052, P3 1060 and P4 1068), respectively. In the example of FIG. 10, tone-symbols (1004, 1008, 1010, 1012, 1016, 1018, 1020, 1024, 1026, 1028, 1032, 1034) carry data symbols (D1 1042, D2 1046, D3 1048, D4 1050, D5 1054, D6 1056, D7 1058, D8 1062, D9 1064, D10 1066, D11 1070, D12 1072), respectively.

Figure 11:
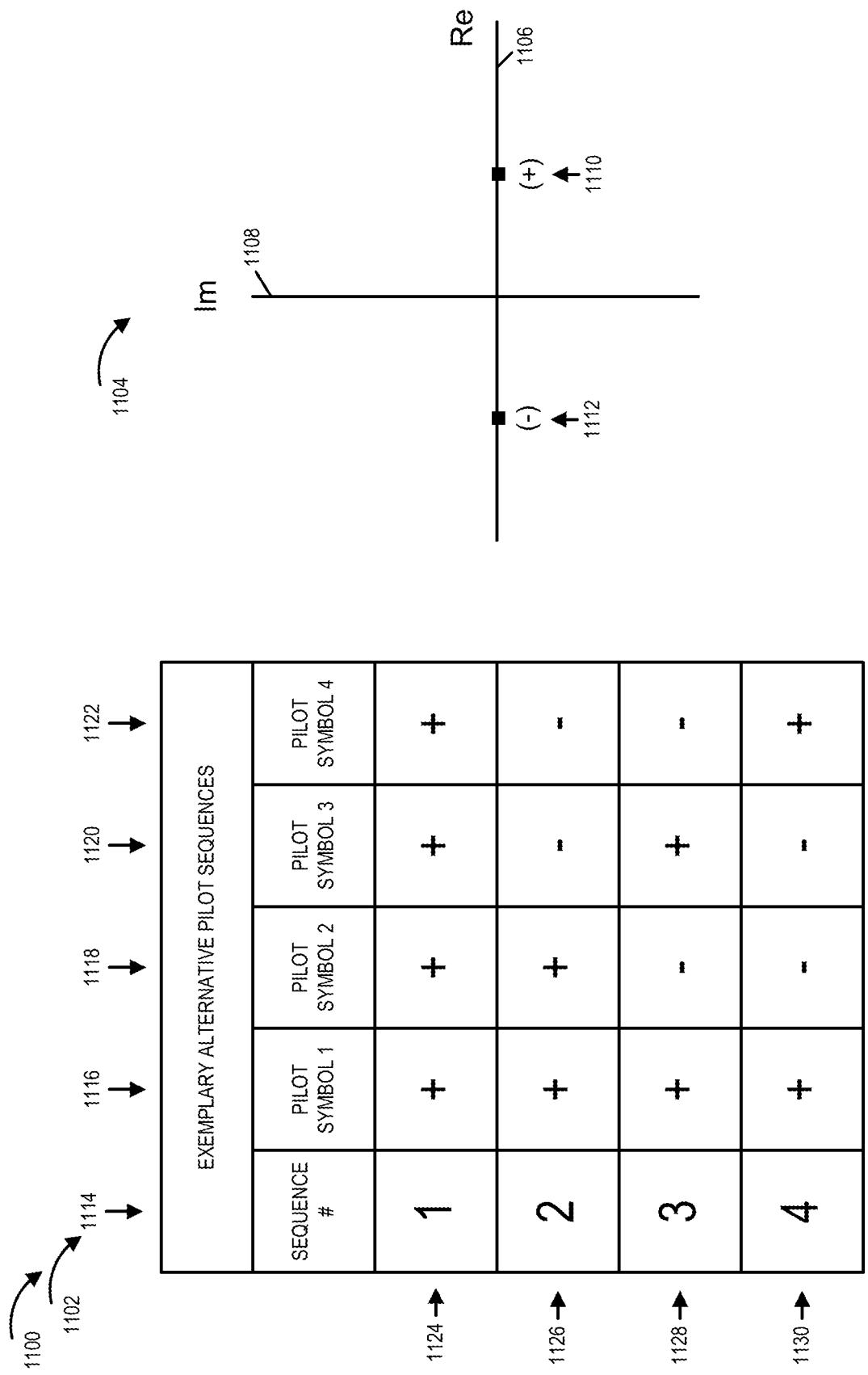
FIG. 11 is a drawing illustrating a table of exemplary alternative pilot sequences and a plot illustrating mapping of a set of two pilot symbols to a complex plane.

FIG. 11 is a drawing 1100 illustrating a table of exemplary alternative pilot sequences 1102 and a plot 1104 illustrating mapping of a set of two pilot symbols to a complex plane. Plot 1104 includes horizontal axis 1106 representing the real axis and vertical axis 1108 representing the Imaginary axis. Pilot symbol designated as "+" 1110 maps along the real axis with a phase angle of 0 degrees, while a pilot symbol designated as "−" 1112 maps along the real axis with a phase angle of 180 degrees. The transmit power level of the "+" pilot symbol is the same as the transmit power level of the "−" pilot symbol.

Table 1102 includes a first column 1114 representing pilot sequence number, a second column 1116 identifying pilot symbol 1 for each of the alternative pilot sequences, a third column 1118 identifying pilot symbol 2 for each of the alternative pilot sequences, a fourth column 1120 identifying pilot symbol 3 for each of the alternative pilot sequences, and a fifth column 1122 identifying pilot symbol 4 for each of the alternative pilot sequences. First row 1124 indicates that pilot sequence 1 follows the pattern +, +, +, +. Second row 1126 indicates that pilot sequence 2 follows the pattern +, +, −, −. Third row 1128 indicates that pilot sequence 3 follows the pattern +, −, +, −. Fourth row 1130 indicates that pilot sequence 4 follows the pattern +, −, −, +.

FIG. 12 is a table 1200 illustrating exemplary congestion level/coding method mapping information for an exemplary embodiment. The information in table 1200 may be stored and used by an exemplary peer to peer wireless terminal. Table 1200 indicates that if the estimated level of network congestion is level 1, which corresponds to a high level of network congestion, then coding method 1 is used for communicating peer discovery data. Pilot sequence 1 is used to communicate coding method 1. Table 1200 further indicates that if the estimated level of network congestion is level 2, which corresponds to a low level of network congestion, then coding method 2 is used for communicating peer discovery data. Pilot sequence 2 is used to communicate coding method 2. Coding method 1 is different from coding method 2 and pilot sequence 1 is different from pilot sequence 2. The two exemplary pilot sequences are, e.g., two of the exemplary pilot sequences illustrated in FIG. 11.

FIG. 13 is a table 1300 illustrating exemplary congestion level/coding method mapping information for an exemplary embodiment. The information in table 1300 may be stored and used by an exemplary peer to peer wireless terminal. Table 1300 indicates that if the estimated level of network congestion is level 1, which corresponds to a high level of network congestion, then coding method 1 is used for communicating peer discovery data. Pilot sequence 1 is used to communicate coding method 1. Table 1300 also indicates that if the estimated level of network congestion is level 2, which corresponds to an intermediate level of network congestion, then coding method 2 is used for communicating peer discovery data. Pilot sequence 2 is used to communicate coding method 2. Table 1300 further indicates that if the estimated level of network congestion is level 3, which corresponds to a low level of network congestion, then coding method 3 is used for communicating peer discovery data. Pilot sequence 3 is used to communicate coding method 3. Coding methods 1, 2 and 3 are different from one another and pilot sequences 1, 2 and 3 are different from one another. The three exemplary pilot sequences are, e.g., three of the exemplary pilot sequences illustrated in FIG. 11.

FIG. 14 is a table 1400 illustrating exemplary congestion level/coding method mapping information for an exemplary embodiment. The information in table 1400 may be stored and used by an exemplary peer to peer wireless terminal. Table 1400 indicates that if the estimated level of network congestion is level 1 then coding method 1 is used for communicating peer discovery data. Coding method 1 includes using data rate 1 for coding peer discovery data. Table 1400 further indicates that if the estimated level of network congestion is level 2 then coding method 2 is used for communicating peer discovery data. Coding method 2 includes using data rate 2 for coding peer discovery data. Table 1400 further indicates that if the estimated level of network congestion is level N then coding method N is used for communicating peer discovery data. Coding method N includes using data rate N for coding peer discovery data. In this example, each of the coding rates (coding rate 1, coding rate 2, . . . , coding rate N) are different. In some embodiments, at least two of the coding rates corresponding to different estimated levels of network congestion are different.

FIG. 15 is a table 1500 illustrating exemplary congestion level/coding method mapping information for an exemplary embodiment. The information in table 1500 may be stored and used by an exemplary peer to peer wireless terminal. Table 1500 indicates that if the estimated level of network congestion is level 1 then coding method 1 is used for communicating peer discovery data. Coding method 1 includes using convolution code 1 for coding peer discovery data. Table 1500 further indicates that if the estimated level of network congestion is level 2 then coding method 2 is used for communicating peer discovery data. Coding method 2 includes using convolution code 2 for coding peer discovery data. Table 1500 further indicates that if the estimated level of network congestion is level N then coding method N is used for communicating peer discovery data. Coding method N includes using convolution code N for coding peer discovery data. In this example, each of the convolution codes (convolution code 1, convolution code 2, . . . , convolution code N) are different. In some embodiments, at least two of the convolution codes corresponding to different estimated levels of network congestion are different.

Figure 16:
FIG. 16 is a table illustrating exemplary congestion level/coding method mapping information for an exemplary embodiment in which different coding methods are used corresponding to different estimated levels of network congestion and at least some different coding methods correspond to amounts of peer discovery channel usage.

FIG. 16 is a table 1600 illustrating exemplary congestion level/coding method mapping information for an exemplary embodiment. The information in table 1600 may be stored and used by an exemplary peer to peer wireless terminal. Table 1600 indicates that if the estimated level of network congestion is level 1, e.g., a high level of congestion, then coding method 1 is used for communicating peer discovery data. For coding method 1, the wireless terminal uses ⅓ of a peer discovery broadcast channel for broadcasting its peer discovery signals. For example, the wireless terminal uses one of portions A, B and C of one of the exemplary channels of FIG. 8. Table 1600 further indicates that if the estimated level of network congestion is level 2, e.g., an intermediate level of congestion, then coding method 2 is used for communicating peer discovery data. For coding method 2, the wireless terminal uses ⅔ of a peer discovery broadcast channel for broadcasting its peer discovery signals. For example, the wireless terminal uses two of portions A, B and C of one of the exemplary channels of FIG. 8. Table 1600 further indicates that if the estimated level of network congestion is level 3, e.g., a low level of congestion, then coding method 3 is used for communicating peer discovery data. For coding method 3, the wireless terminal uses a full peer discovery broadcast channel for broadcasting its peer discovery signals. For example, the wireless terminal uses each of the A, B and C portions of one of the exemplary channels of FIG. 8.

Figure 17:
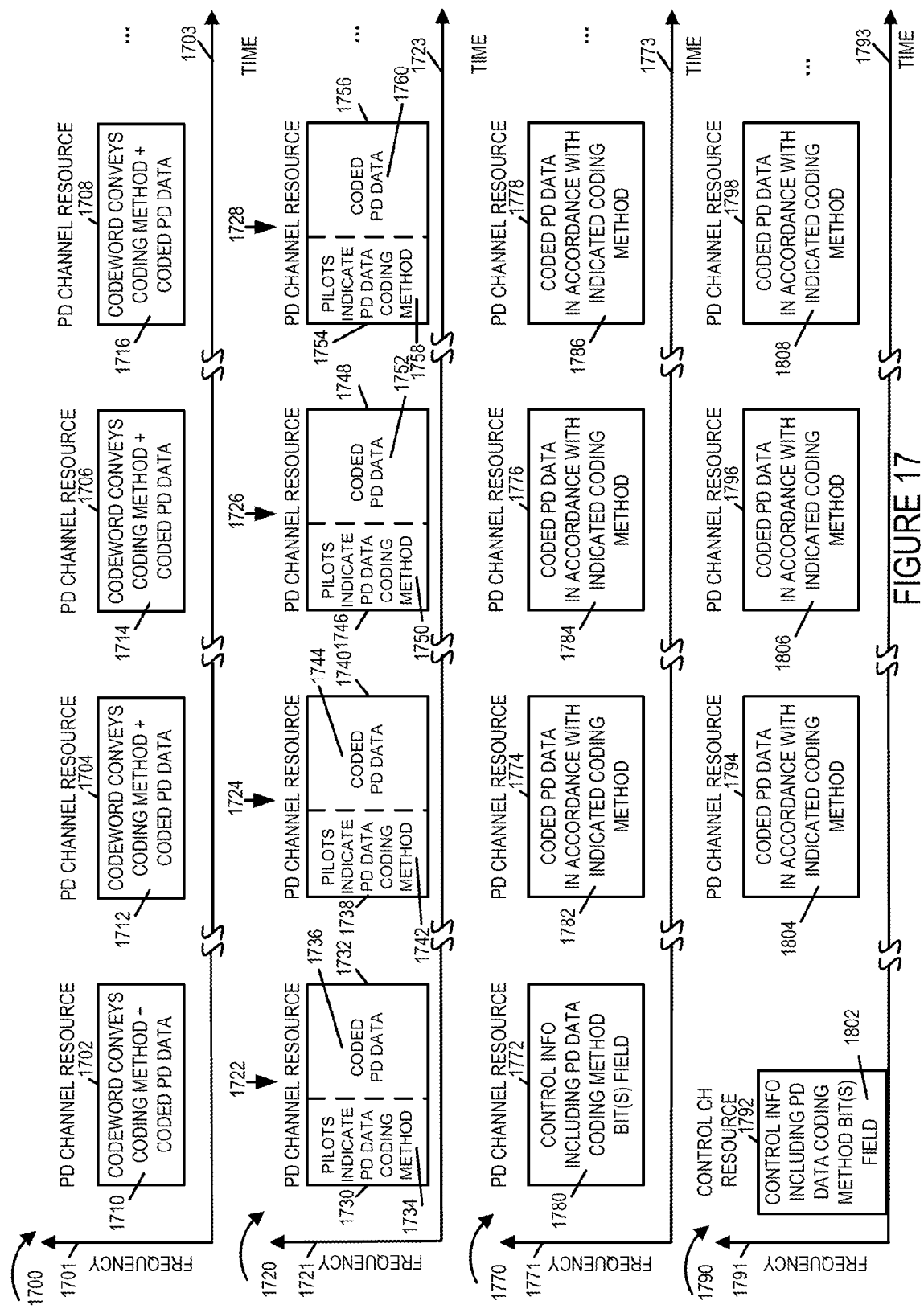
FIG. 17 is a drawing illustrating four different exemplary implementations of communicating information indicating a selected coding method and communicating data coded using the selected coding method with regard to peer discovery.

FIG. 17 is a drawing illustrating four different exemplary implementations of communicating information indicating a selected coding method and communicating data coded using the selected coding method with regard to peer discovery. Consider that a wireless communications device, e.g., a mobile node supporting peer to peer communications, has estimated a level of network congestion based on monitored detected peer discovery signals from other devices in its vicinity and has selected one of a plurality of different coding methods to use for its peer discovery data transmissions based on the estimated level of network congestion.

Drawing 1700 is an example in which a codeword communicated in a peer discovery channel resource communicates both the coding method being used and coded peer discovery data. Drawing 1700 is a plot of frequency on the vertical axis 1701 vs time on the horizontal axis 1703. Each of the peer discovery channel resources, e.g., peer discovery segments, being used for transmission by the wireless communications device (1702, 1704, 1706, 1708, . . . ) carry a codeword conveying the coding method being used and peer discovery data being communicated (1710, 1712, 1714, 1716).

Drawing 1720 is an example in which pilot signals in a pilot portion of a peer discovery channel resource communicate information indicating the selected peer discovery coding method for peer discovery data, and coded peer discovery data signals in a data portion of the peer discovery channel resource, coded in accordance with the indicated coding method, convey the peer discovery data. Drawing 1720 is a plot of frequency on the vertical axis 1721 vs time on the horizontal axis 1723. Each of the peer discovery channel resources, e.g., peer discovery segments, being used for transmission by the wireless communications device (1722, 1724, 1726, 1728, . . . ) include a pilot portion (1730, 1738, 1746, 1754), respectively, and a data portion (1732, 1740, 1748, 1756), respectively. The pilot portion of a peer discovery resource, in this example, conveys information indicating the selected peer discovery coding method used for the corresponding data portion. Pilot portion 1730 communicates information 1734 indicating the peer discovery data coding method used for coded peer discovery data 1736 communicated in peer discovery data portion 1732 of peer discovery channel resource 1722. Pilot portion 1738 communicates information 1742 indicating the peer discovery data coding method used for coded peer discovery data 1744 communicated in peer discovery data portion 1740 of peer discovery channel resource 1724. Pilot portion 1746 communicates information 1750 indicating the peer discovery data coding method used for coded peer discovery data 1752 communicated in peer discovery data portion 1748 of peer discovery channel resource 1726. Pilot portion 1754 communicates information 1758 indicating the peer discovery data coding method used for coded peer discovery data 1760 communicated in peer discovery data portion 1756 of peer discovery channel resource 1728.

FIG. 1770 is a drawing in which control information indicating a selected peer discovery data coding method is communicated in a peer discovery data coding bit(s) field of a peer discovery channel resource. Drawing 1770 is a plot of frequency on the vertical axis 1771 vs time on the horizontal axis 1773. Some of the peer discovery channel resources, e.g., peer discovery segments, being used for transmission by the wireless communications device, carry control information including information indicating a selected coding method being used for peer discovery data. Other peer discovery channel resources are used to carry peer discovery data. More peer discovery channel resources are used to convey peer discovery data than are used to communicate control information. In this example, peer discovery channel resource 1772 communicates control information 1780 including information indicating the selected peer discovery data coding method to be used and is communicated in one or more bits in a peer discovery coding method bit(s) field. Peer discovery channel resource 1774 includes coded peer discovery data 1782 which has been coded in accordance with the coding method indicated in information 1780. Peer discovery channel resource 1776 includes coded peer discovery data 1784 which has been coded in accordance with the coding method indicated in information 1780. Peer discovery channel resource 1778 includes coded peer discovery data 1786 which has been coded in accordance with the coding method indicated in information 1780.

FIG. 1790 is a drawing in which control information indicating a selected peer discovery data coding method is communicated in a peer discovery data coding bit(s) field of a control channel resource. Drawing 1790 is a plot of frequency on the vertical axis 1791 vs time on the horizontal axis 1793. Peer discovery channel resources are used to carry peer discovery data. In this example, control channel resource 1792 communicates control information 1802 including information indicating the selected peer discovery data coding method to be used and is communicated in one or more bits in a peer discovery coding method bit(s) field. Peer discovery channel resource 1794 includes coded peer discovery data 1804 which has been coded in accordance with the coding method indicated in information 1802. Peer discovery channel resource 1796 includes coded peer discovery data 1806 which has been coded in accordance with the coding method indicated in information 1802. Peer discovery channel resource 1798 includes coded peer discovery data 1808 which has been coded in accordance with the coding method indicated in information 1802.

Figure 18:
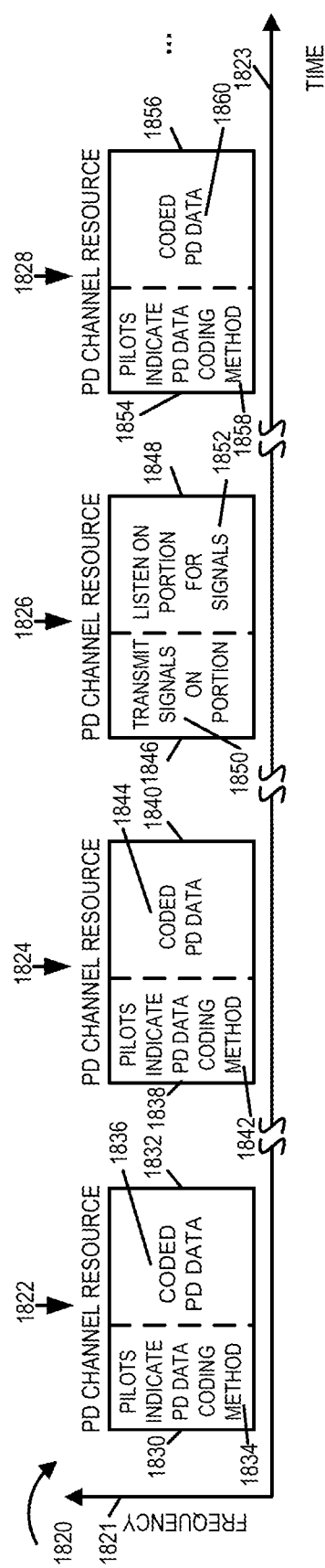
FIG. 18 is a drawing illustrating another exemplary implementation of communicating information indicating a selected coding method and communicating data coded using the selected coding method with regard to peer discovery.

FIG. 18 is a drawing illustrating another exemplary implementation of communicating information indicating a selected coding method and communicating data coded using the selected coding method with regard to peer discovery. Consider that a wireless communications device, e.g., a mobile node supporting peer to peer communications, has estimated a level of network congestion based on monitored detected peer discovery signals from other devices in its vicinity and has selected one of a plurality of different coding methods to use for its peer discovery data transmissions based on the estimated level of network congestion.

Drawing 1820 is an example in which pilot signals in a pilot portion of a peer discovery channel resource communicate information indicating the selected peer discovery coding method for peer discovery data, and coded peer discovery data signals in a data portion of the peer discovery channel resource, coded in accordance with the indicated coding method, convey the peer discovery data. Drawing 1820 is a plot of frequency on the vertical axis 1821 vs time on the horizontal axis 1823. Each of the peer discovery channel resources, e.g., peer discovery segments, are used for transmission by the wireless communications device (1822, 1824, 1828) and include a pilot portion (1830, 1838, 1854), respectively, and a data portion (1832, 1840, 1856), respectively. The pilot portion of a peer discovery resource, in this example, conveys information indicating the selected peer discovery coding method used for the corresponding data portion. Pilot portion 1830 communicates information 1834 indicating the peer discovery data coding method used for coded peer discovery data 1836 communicated in peer discovery data portion 1832 of peer discovery channel resource 1822. Pilot portion 1838 communicates information 1842 indicating the peer discovery data coding method used for coded peer discovery data 1844 communicated in peer discovery data portion 1840 of peer discovery channel resource 1824. Pilot portion 1854 communicates information 1858 indicating the peer discovery data coding method used for coded peer discovery data 1860 communicated in peer discovery data portion 1856 of peer discovery channel resource 1828.

Peer discovery channel resource 1826 includes a first portion 1846 and a second portion 1848. The wireless communications device, e.g., mobile node which is transmitting on resources 1822, 1824 and 1828, also transmits signals 1850 using first portion 1846 of peer discovery channel resource 1826. The wireless communications device listens for received peer discovery signals from other devices 1852 on second portion 1848 of peer discovery channel resource 1826. In some embodiments, the wireless communications device listens on the entire peer discovery channel resource 1826. In some embodiments, the wireless communications device selects, e.g., pseudo-randomly selects, which one of the peer discovery channel resources (1822, 1824, 1826, 1828) is to be used, at least partially, for listening. Thus, in some embodiments, the wireless communications device, e.g., mobile node, periodically listens on its selected peer discovery resource channel, e.g., self-assigned peer discovery resource channel, to see if there are any other devices currently sharing the same resource as itself.

Any of the examples described in FIG. 17 and/or FIG. 18 may be used in an exemplary method such as the method of flowchart 200 and/or in an exemplary apparatus such as communications device 300 of FIG. 3.

Various features and aspects of some, but not necessarily all, exemplary embodiments will be described. In some peer to peer networks, it may be desirable to have one or more intervals in a peer to peer recurring timing structure where each device may broadcast information about itself and during which a device may also listen for information being broadcast from other devices. In one exemplary embodiment, such an interval is referred to as the peer discovery phase of peer to peer recurring timing structure. Typically the resources allocated for this purpose, e.g., peer discovery, are limited while the number of users in the system can be very large in a dense deployment resulting in a need for a large number of users to share a limited resource. Various aspects relate to methods and apparatus making a codebook choice as a function of a determined level of congestion in the network, e.g., different codebook choices are made corresponding to different estimated congestion levels of the network. In various embodiments, an individual wireless terminal, e.g., a handheld mobile device, generates an estimate of a level of network congestion without the aid of another device communicating a level of network congestion.

For broadcast channels such as peer discovery channels there is typically no channel SINR feedback from the receivers. In various embodiments, a transmitter device adapts its codebook choice, e.g., its coding method, according to the congestion level of the network. In one such embodiment the broadcast channel is a peer discovery channel in a peer to peer recurring timing structure.

In various embodiments, the network congestion level is estimated by a wireless device, e.g., a mobile node, based on received signals from other devices, e.g., based on received peer discovery signals from other devices which may be in the vicinity. In some embodiments, transmitted peer discovery signals include pilot signals, e.g., a pilot symbol sequence. Some embodiments include the use of pilot phases to facilitate detection and network congestion estimation. Other embodiments, implement network congestion estimation without including the use of pilot phases. In some embodiments, a device performs an estimate of the network congestion level from its viewpoint. This approach of obtaining a coarse estimate, in some embodiments, is performed without using locally orthogonal pilot phases in the implementation. In some embodiments, pilot phases are used and can provide a much better granularity of the network congestion level. In some embodiments, the network congestion level estimation is based on the level of occupancy of the peer discovery resources in the peer discovery phase by conducting energy detection on each of the peer discovery resources. For example, if the level of occupancy is high, the mobile node can determine that the network congestion level is high. In some other embodiments, a mobile node stops transmission in the peer discovery resource acquired by the mobile, e.g., peer discovery resource self-assigned by the mobile, in a periodic manner to listen to the other potential peers transmitting on the resource. Then it determines the network congestion level is based on the energy level it detected on its acquired resource. In some embodiments, pilot sequences are used to aid the detection of other peers and enable a mobile device to detect the number of co-existing peers on one peer discovery resource. In this case, a mobile node can determine the network congestion level based on the number of detected peers on its acquired peer discovery resource.

In some embodiments, a device estimates a network congestion level based on received signals, e.g., received peer discovery signals from other devices which were detected. Then, the device chooses a codebook, e.g., a coding method, from a plurality of different codebooks as a function of the estimated network congestion level. In some embodiments, different estimated network congestion levels correspond, e.g., map, to different codebooks. In some embodiments, the index of the chosen codebook is also transmitted so that other devices which receive the transmitted codeword can know what codebook they should use to decode the codeword. There are several alternative approaches that may be used to communicate the index of the chosen codebook. One method is to embed the codebook choice within the codeword, i.e. in the form of inband rate signaling. In some embodiments two codebooks are used, one for high congestion level scenario, and the other for low congestion level scenario. In some other embodiments, more than two codebooks are used, e.g., a first codebook for a high level of network congestion, a second codebook for an intermediate level of network congestion, and a third codebook for a low level of network congestion. Returning to the example in which there are two codebooks used, in such an embodiment one bit of information is sufficient to communicate the codebook choice, and thus one bit is sometimes used for this purpose. In a second approach, information communicating the codebook choice is sent separately in the form of a codebook selection field in a set of format bits. The format bits, in some embodiments, are communicated at a slower, e.g., lower, rate than peer discovery data being communicated, e.g., a peer device identifier being broadcast.

Depending upon the embodiment, a particular set of alternative codebooks are implemented. Some possible choices of different codebooks will now be described. One possible choice is to use a lower rate code (but the same structure) at high interference (high congestion) than is used at low interference (low congestion). Another option, used in some embodiments, is to choose a codebook which is much shorter in coding length but with a higher data rate, when the network is congested than when the network is not congested. For example, a user can choose to transmit only on ⅓ of the acquired resources, e.g., self-assigned resources, and keep silent at the rest ⅔ of the resource. In some embodiments where pilot phases are used to transmit the codeword choice information, it is possible that local users maintain a particular way of choice of codewords occupying different portions of the assigned resources to minimize the overlapping probability. For example, when a new user acquires, e.g., self-assigns, a peer discovery resource, it first detects the current users using the resource and further the codebooks they are using. It can then pick a codeword occupying a non-overlapping ⅓ of the resource as compared to the existing peers and transmit its coded data on that portion of the peer discovery resource. Finally, it is also possible to use different convolutional codes as a function of two (for example) different network congestion levels. This simplifies the RX encoding, keeps the TX complexity constant, and may still improve the overall network performance in a dense scenario. The decoder, e.g., a Viterbi decoder, keeps the same constraint length K so that the RXs can, e.g., use either a (K−1)/2+1 constraint length convolutional code or a K constraint length convolutional code, depending respectively whether the network congestion level is high or low. In some embodiments, in the two cases, the same Viterbi core performs maximum likelihood decoding.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a wireless communications device, the method comprising:
estimating a level of network congestion based on detected peer discovery signals received from multiple different devices;
selecting one of a plurality of different coding methods based on the estimated level of network congestion;
communicating information indicating the selected coding method; and
transmitting peer discovery data, on a peer discovery channel, coded using the selected one of the plurality of different coding methods;
wherein estimating the level of network congestion includes:

detecting peer discovery signals corresponding to said multiple different devices, said signals having been transmitted on a peer discovery communications resource, said peer discovery communications resource being the same resource for the multiple different devices; and
generating an estimate of network congestion based on the detected peer discovery signals corresponding to said multiple different devices using the same peer discovery communications resource.

2. The method of claim 1,
wherein estimating the level of network congestion includes estimating which of a plurality of different levels of network congestion the network is operating at;
wherein communicating information indicating the selected coding method includes transmitting control information indicating the coding method being used for coding peer discovery data on a control channel resource, said control channel resource being different from peer discovery channel resources used to transmit said peer discovery data on the peer discovery channel.

3. The method of claim 2, wherein the information indicating the selected coding method is transmitted less frequently than said peer discovery data.

4. The method of claim 1, wherein communicating information indicating the selected coding method includes transmitting control information indicating the coding method being used for coding peer discovery data on said peer discovery channel using a separate peer discovery communications resource than is used to transmit said peer discovery data on the peer discovery channel.

5. The method of claim 1,
wherein communicating information indicating the selected coding method includes transmitting a pilot sequence indicating the coding method being used for coding peer discovery data along with coded peer discovery data, said pilot sequence being one of a plurality of different pilot sequences, different ones of said different pilot sequences indicating different coding methods.

6. The method of claim 1, wherein said peer discovery signals corresponding to said multiple different devices which were transmitted on the same peer discovery communications resource include different pilot signals.

7. The method of claim 1, wherein at least one of the coding methods uses less than all the available resources for transmitting peer discovery data.

8. The method of claim 7, wherein said at least one of the coding methods uses ⅓ of the available resources for communicating said peer discovery data.

9. The method of claim 1, wherein communicating information indicating the selected coding method includes transmitting a codeword that conveys information indicating both the coding method and coded peer discovery data.

10. A wireless communications device comprising:
means for estimating a level of network congestion based on detected peer discovery signals received from multiple different devices, said means for estimating being implemented in hardware;
means for selecting one of a plurality of different coding methods based on the estimated level of network congestion, said means for selecting being implemented in hardware;
means for communicating information indicating the selected coding method, said means for communicating being implemented in hardware; and means for transmitting peer discovery data, on a peer discovery channel, coded using the selected one of the plurality of different coding methods, said means for transmitting being implemented in hardware;

wherein said means for estimating a level of network congestion includes:

means for monitoring a peer discovery communications resource to detect peer discovery signals corresponding to said multiple different devices, said signals having been transmitted on the peer discovery communications resource, said means for monitoring being implemented in hardware, said peer discovery communications resource being the same resource for the multiple different devices; and means for generating an estimate of network congestion based on the detected peer discovery signals corresponding to said multiple different devices using the same peer discovery communications resource, said means for generating being implemented in hardware.

11. The wireless communications device of claim 10, wherein said means for estimating the level of network congestion estimate which of a plurality of different levels of network congestion the network is operating at; and wherein said means for communicating information indicating the selected coding method transmit control information indicating the coding method being used for coding peer discovery data on a control channel resource, said control channel resource being different from peer discovery channel resources used to transmit said peer discovery data on the peer discovery channel.

12. The wireless communication device of claim 11, wherein the information indicating the selected coding method is transmitted less frequently than said peer discovery data.

13. The wireless communications device of claim 10, wherein said means for communicating information indicating the selected coding method transmit control information indicating the coding method being used for coding peer discovery data on said peer discovery channel using a separate peer discovery communications resource than is used to transmit said peer discovery data on the peer discovery channel.

14. A computer program product for use in a communications device, the computer program product comprising:

a non-transitory computer readable medium comprising:

code for causing at least one computer to estimate a level of network congestion based on detected peer discovery signals received from multiple different devices;

code for causing said at least one computer to select one of a plurality of different coding methods based on the estimated level of network congestion;

code for causing said at least one computer to communicate information indicating the selected coding method; and code for causing said at least one computer to transmit peer discovery data, on a peer discovery channel, coded using the selected one of the plurality of different coding methods;

wherein estimating a level of network congestion includes:

detecting peer discovery signals corresponding to said multiple different devices, said signals having been transmitted on a peer discovery communications resource, said peer discovery communications resource being the same resource for the multiple different devices; and generating an estimate of network congestion based on the detected peer discovery signals corresponding to said multiple different devices using the same peer discovery communications resource.

15. A wireless communications device comprising:

at least one processor configured to:

estimate a level of network congestion based on detected peer discovery signals received from multiple different devices;

select one of a plurality of different coding methods based on the estimated level of network congestion;

communicate information indicating the selected coding method; and transmit peer discovery data, on a peer discovery channel, coded using the selected one of the plurality of different coding methods; and memory coupled to said at least one processor;

wherein said at least one processor is configured to:

detect peer discovery signals corresponding to said multiple different devices: said signals having been transmitted on a peer discovery communications resource, said peer discovery communications resource being the same resource for the multiple different devices; and generate an estimate of network congestion based on the detected peer discovery signals corresponding to said multiple different devices using the same peer discovery communications resource.

16. The wireless communications device of claim 15, wherein said at least one processor is further configured to estimate which of a plurality of different levels of network congestion the network is operating at as part of being configured to estimate the level of network congestion; and wherein said at least one processor is further configured to transmit, as part of being configured to communicate information indicating the selected coding method, control information indicating the coding method being used for coding peer discovery data on a control channel resource, said control channel resource being different from peer discovery channel resources used to transmit said peer discovery data on the peer discovery channel.

17. The wireless communications device of claim 15, wherein said at least one processor is further configured to transmit a pilot sequence indicating the coding method being used for coding peer discovery data, as part of being configured to communicate information indicating the selected coding method, said pilot sequence being one of a plurality of different pilot sequences, different ones of said different pilot sequences indicating different coding methods.

* * * * *